US00RE35622E

United States Patent [19]

Wilson

[11] E Patent Number: Re. 35,622

[45] Reissued Date of Patent: Oct. 7, 1997

[54] DUAL SYNCHRONOUS OPENING MIRROR DOORS FOR SUN VISORS

[75] Inventor: Douglas J. Wilson, Ft. Gratiot, Mich.

[73] Assignee: Lear Corporation, Southfield, Mich.

[21] Appl. No.: 627,021

[22] Filed: Apr. 3, 1996

Related U.S. Patent Documents

Reissue of:

[64] Patent No.: 5,301,994
Issued: Apr. 12, 1994
Appl. No.: 960,957
Filed: Oct. 14, 1992

[51] Int. Cl.[6] ..... B60J 3/00

[52] U.S. Cl. ..... 296/97.2; 296/97.5; 49/116; 49/122

[58] Field of Search ..... 296/97.2, 97.3, 296/97.1, 97.5; 49/116, 122

[56] References Cited

U.S. PATENT DOCUMENTS

| | | | |
|---|---|---|---|
| 522,936 | 7/1894 | Engel | 49/116 |
| 523,711 | 7/1894 | Rawle | 49/116 |
| 575,162 | 1/1897 | Munderloh | 49/116 |
| 778,952 | 1/1905 | Cornell | 49/116 |
| 832,458 | 10/1906 | Cessey | 49/116 |
| 874,612 | 12/1907 | McCandless | 49/122 |
| 954,587 | 4/1910 | Poulson | 49/122 |
| 966,276 | 8/1910 | Webb | 49/116 |
| 3,094,007 | 6/1963 | Luhrs | 49/116 X |
| 4,227,241 | 10/1980 | Marcus | 362/61 |
| 4,421,355 | 12/1983 | Marcus | 296/97.1 |
| 4,564,234 | 1/1986 | Kaiser et al. | 296/97.1 |
| 4,648,011 | 3/1987 | Boote et al. | 362/135 |
| 4,653,798 | 3/1987 | White et al. | 296/97.1 |
| 4,685,723 | 8/1987 | Canadas | 296/97.1 |
| 4,791,537 | 12/1988 | Fisher et al. | 362/135 |
| 4,922,391 | 5/1990 | Dykstra | 362/144 |
| 4,948,240 | 8/1990 | Zipperle | 350/606 |
| 4,961,608 | 10/1990 | Nash | 296/97.5 |
| 4,971,383 | 11/1990 | Tawaraya | 362/135 |
| 4,979,079 | 12/1990 | Tawaraya | 362/135 |
| 5,014,169 | 5/1991 | Chetwynd | 362/142 |
| 5,054,839 | 10/1991 | White et al. | 296/97.1 |
| 5,061,003 | 10/1991 | Gabas | 296/97.1 |
| 5,061,004 | 10/1991 | Happich et al. | 296/97.5 |
| 5,104,174 | 4/1992 | Gute | 296/97.4 |
| 5,441,325 | 8/1995 | Toth et al. | 296/97.2 |

FOREIGN PATENT DOCUMENTS

| | | | |
|---|---|---|---|
| 2429685 | 2/1980 | France | 296/97.5 |

*Primary Examiner*—Joseph D. Pape
*Attorney, Agent, or Firm*—Brooks & Kushman P.C.

[57] ABSTRACT

A hollow visor is provided which is adapted to receive a mirror and which defines a channel. A plurality of doors are provided which are located within the visor and which are movable within the channel for selectively moving between an extended position which covers the mirror in the retracted position and which uncovers the mirror. Interconnecting levers are provided for interconnecting the plurality of doors provided for simultaneous movement thereof between the extended position and the retracted position when one of the plurality of doors is moved.

10 Claims, 2 Drawing Sheets

DUAL SYNCHRONOUS OPENING MIRROR DOORS FOR SUN VISORS

Matter enclosed in heavy brackets [ ] appears in the original patent but forms no part of this reissue specification; matter printed in italics indicates the additions made by reissue.

TECHNICAL FIELD

This invention relates to visors and in particular visors having a mirror which may be covered and uncovered by simultaneous movement of a pair of doors in opposed relation.

BACKGROUND ART

Visors are included as part of original equipment furnished with a motor vehicle. Mirrors were soon added as a convenience item for vehicle occupants.

Initially, mirrors attached to a visor were not covered. Subsequently thereto, different methods were made available for covering the mirror. For example, U.S. Pat. No. 4,971,383 to Tawaraya discloses a mirror attached to a sub-visor which is covered by being moved within a cavity formed in a mirror holder portion. More recently, the mirror was covered by a door which cooperated with an electrical circuit to activate an illumination device for illuminating the mirror once the door was moved to a retracted position uncovering the mirror.

U.S. Pat. No. 5,054,839 to White et al. discloses a mirror covered by a sliding door which cooperates with an illumination circuit to illuminate the mirror once the door has moved the retracted position. In this configuration, a single door is used for selectively covering and uncovering the mirror.

U.S. Pat. No. 5,061,003 to Gabas discloses a mirror having a plurality of rigid sheet-like plates utilized for covering a mirror disposed within a visor. In this configuration, the plates are in chain-like series relative to one another enabling the sliding of one plate over the other when moving between an open position within the housing and a closed position covering the mirror.

U.S. Pat. No. 5,104,174 to Gute discloses an expandable covered mirror visor having a lever and/or rack and gear mechanism interconnecting at least a pair of blades enabling simultaneous movement between a retracted position and an extended position for a plurality of blades. In this configuration, the blades are capable of simultaneous movement between the retracted and extended positions to expand the size of the visor to increase glare protection.

The present invention incorporates many of the known benefits of providing doors for covering and uncovering a visor mirror while improving the ease of use for the occupant of the vehicle.

SUMMARY OF THE INVENTION

An object of the present invention is to provide a mechanism for selectively covering and uncovering a mirror on a vehicle visor. To do so, a hollow visor is provided which is adapted to receive a mirror and which defines a channel. A plurality of doors are provided which are movable within the channel for selective movement between an extended position covering the mirror and a retracted position uncovering the mirror. A means interconnecting the plurality of doors is provided for simultaneous movement of the doors between the extended position and the retracted position when one of the plurality of doors is moved.

A further object of the present invention is to provide a mechanism for selectively covering and uncovering a mirror for use with a vehicle visor. The mechanism contains a hollow visor adapted to receive a mirror and which defines a channel. A plurality of doors are provided which are located within the visor and movable within the channel for selective movement between an extended position covering the mirror and a retracted position uncovering the mirror. Two of the plurality of doors are in opposed relation for opposed movement therebetween. A grip means is provided which is located on two of the plurality of doors for gripping the two of the plurality of doors for enabling opposed movement thereof between the extended and retracted positions.

An object of the present invention is to provide simultaneous movement of a pair of opposed doors for selectively covering and uncovering a visor mirror.

An additional object of the present invention is to provide simultaneous movement of a plurality of doors for selectively covering and uncovering a visor mirror.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

The preferred embodiment depicted in FIGS. 1 through 5 illustrates a visor, generally indicated at 10, including a hollow shell, generally indicated at 12, having a mirror, generally indicated at 14. The mirror 14 is supported within the shell 12 by a housing, generally indicated at 16.

Figure 5:
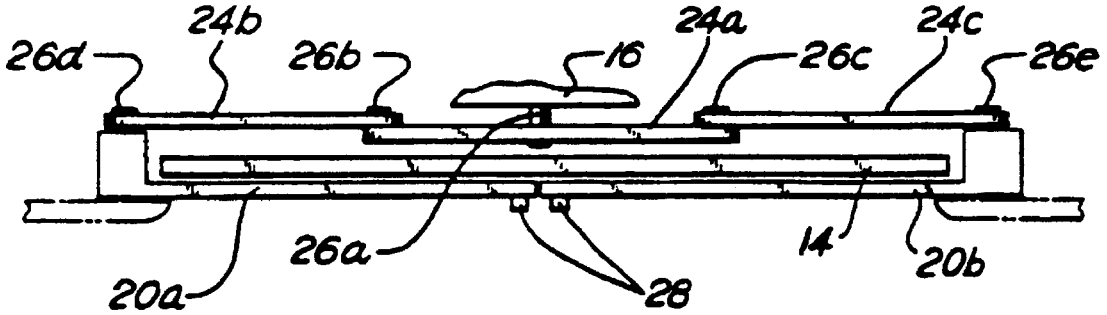
FIG. 5 is a fragmentary bottom view taken along line 5—5 of FIG. 4 showing the cooperation of the dual synchronous doors and the lever system in accordance with the present invention.

The housing 16, as shown in FIG. 5 defines a channel 18 which is located such that the mirror 14 can be selectively covered and uncovered by a plurality of doors 20. The plurality of doors 20, in this embodiment include a first door 20a and a second door 20b mounted within the channel 18. The first door 20a and the second door 20b cooperate with the channel 18 so as to freely travel between a retracted position substantially within the shell 12 which uncovers the mirror 14 and an extended position substantially outside the shell 12 which covers the mirror 14.

Figure 1:
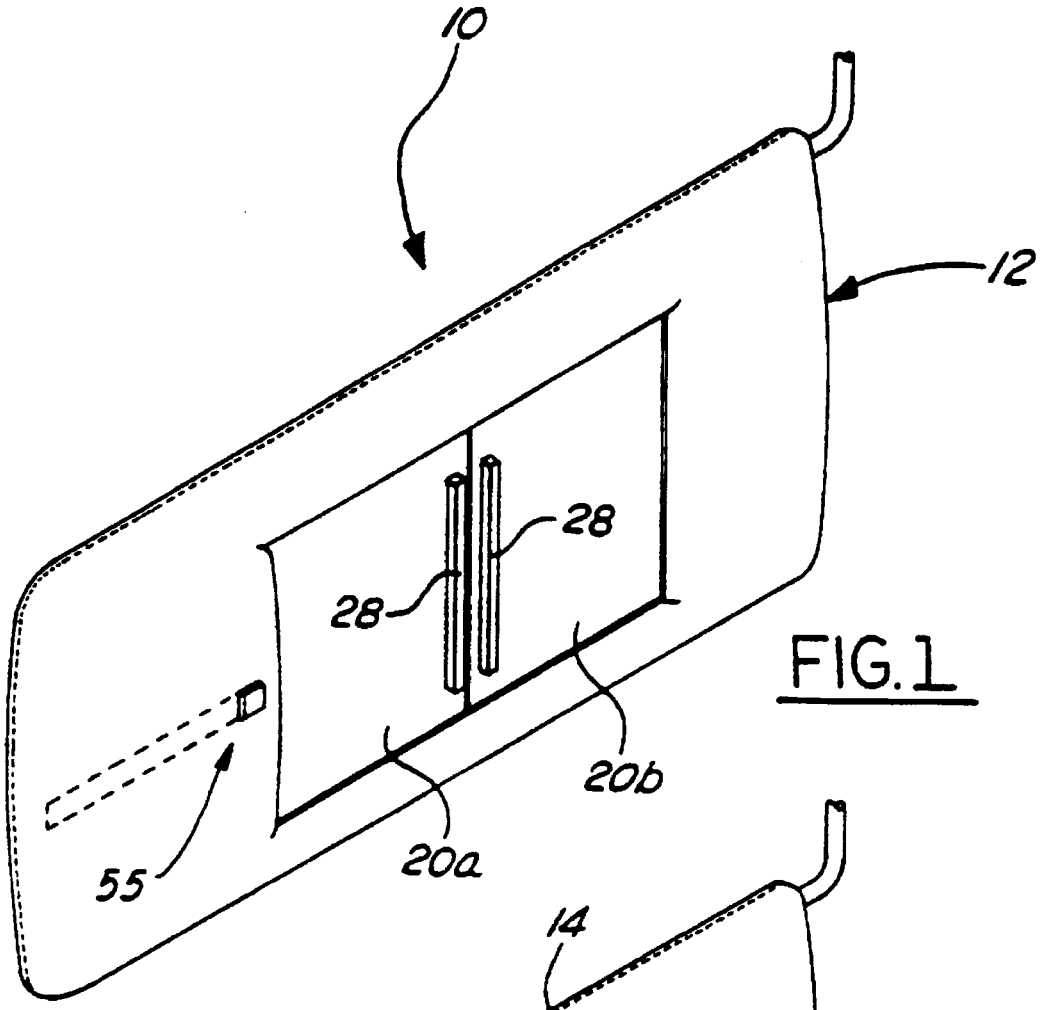
FIG. 1 is a perspective view of the dual synchronous mirror doors shown in the extended position in accordance with the present invention.

As shown in FIG. 1 the first door 20a and the second door 20b are in opposed relation to each other. Specifically, the first door 20a and the second door 20b travel in opposite directions when moving between the retracted position and the extended position. It is also possible to utilize a plurality of doors having an accordion-type connection so as to alternatively fold or unfold relative one another and travel in opposed relation to selectively cover and uncover the mirror in accordance with the present invention. It is also possible to have both the doors 20a and 20b or one of the doors 20a and 20b cooperate with an illumination device to illuminate the mirror when the doors are in or moved toward the retracted position.

Figure 4:
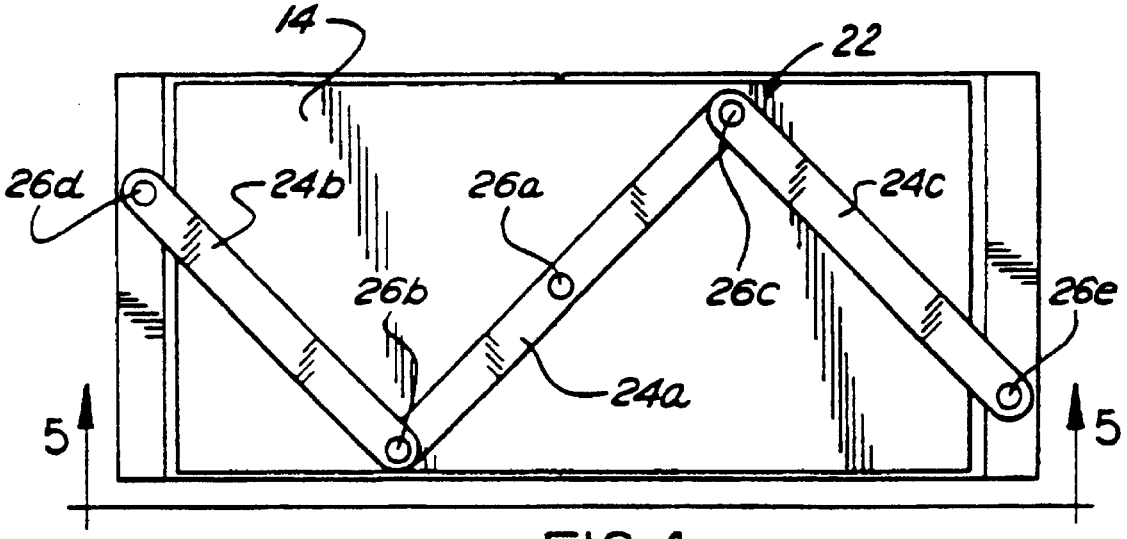
FIG. 4 is an elevational view similar to that shown in FIG. 3 showing the internal operations of a lever system or mechanism for moving the doors in accordance with the present invention.

As shown in FIG. 4, a lever mechanism 22 is formed by a series of three levers 24a, 24b, and 24c which are located behind the mirror 14 within the visor 10. The first lever 24c is centrally located within the visor 10 in between a connecting means in the form of the second lever 24b and the third lever 24c. The first lever 24a is affixed to the visor 10 by a first pivot pin 26a. The first lever 24a pivots about the first pivot pin 26a between a generally vertical orientation when the doors 20a and 20b are in the extended position and a generally horizontal position when the doors 20a and 20b are in the retracted position.

A second pivot pin 26b and a third pivot pin 26c are located at each end of the first lever 24a to pivotally affix the second lever 24b and the third lever 26c to the first lever 24a respectively. The second pivot pin 26b and the third pivot pin 26c are interposed between the first lever 24a and the second lever 24b and the third lever 24c, but the second pivot pin 26b and the third pivot pin 26c are not affixed to the visor 10. Thus, the second pivot pin 26b and the third pivot pin 26c travel with the first lever as it [pivot] *pivots* between the generally horizontal orientation and the generally vertical orientation depending on the position of the doors 20a and 20b.

A fourth pivot pin 26d and a fifth pivot pin 26e are located at distal ends of the second lever 24b and the third lever 24c respectively. The fourth pivot pin 26d is interposedly affixed between the first door 20a and the second lever 24b and the fifth pivot pin 26e is interposedly affixed to the second door 20b and the third lever 24c. The fourth pivot pin 26d and the fifth pivot pin 26e enable the second lever 24b and the third lever 24c to control movement of the first door 20a and the second door 20b respectively.

Figure 2:
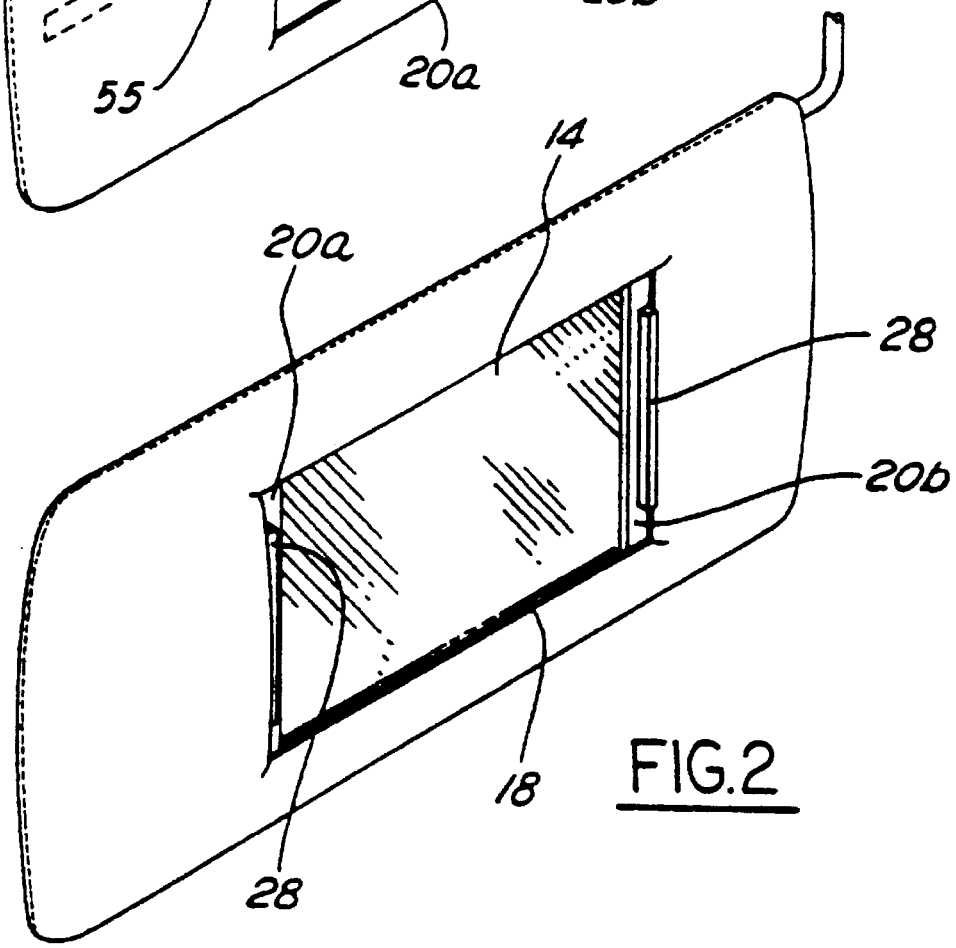
FIG. 2 is a perspective view similar to that shown in FIG. 1, showing the doors in their retracted position exposing the mirror.

In the embodiment shown in FIGS. 1, 2 and 5, at least one door (here both doors 20a and 20b) have a handle 28 centrally located at its outermost edge, which is used to initiate the action of extending or retracting the doors 20a and 20b. As one of the doors 20a and 20b is moved between the retracted position to the extended position, both doors 20a and 20b simultaneously move as a result of the lever mechanism 22. An alternative to the preferred embodiment shown in phantom in FIG. 1 would include a remote lever or slide 55 which is connected to at least one of the doors 20a and 20b to initiate the action of extending or retracting the doors 20a and 20b.

In operation, the vehicle occupant grips the handle 28 of one or both of the doors 20a and 20b and moves the one or both of the doors 20a and 20b from the extended position covering the mirror 14 toward the retracted position. As the one of the doors 20a and 20b begins to move toward the retracted position, the second lever 24b and the third lever 24c travel with the first door 20a and the second door 20b respectively. To travel with their respective doors 20a and 20b, the second lever 24b and the third lever 24c pivot about the second pivot pin 26b and the third pivot pin 26c respectively as the fourth pivot pin 26d and the fifth pivot pin 26e pivot [one] *on* the first door 20a and the second door 20b respectively. As the doors 20a and 20b continue to move toward the retracted position, the first door 20a moves away from the second door 20b. This continued movement of the first door 20a away from the second door 20b causes the second pivot pin 26b and the third pivot pin 26c to cause the first lever 24a to pivot clockwise about the first pivot pin 26a from the generally vertical orientation toward the generally horizontal orientation. The first lever 24a, the second lever 24b and the third lever 24c continue to pivot about the first pivot pin 26a, the second pivot pin 26b, the third pivot pin 26c, the fourth pivot pin 26d and the fifth pivot pin 26e as the first door 20a and the second door 20b continue to move in opposite directions until reaching the retracted position substantially within the visor 10 to uncover the mirror 14. To cover the mirror 14, the vehicle occupant simply reverses the process which results in the same movement of the lever mechanism 22 occurring but in reverse.

Figure 3:
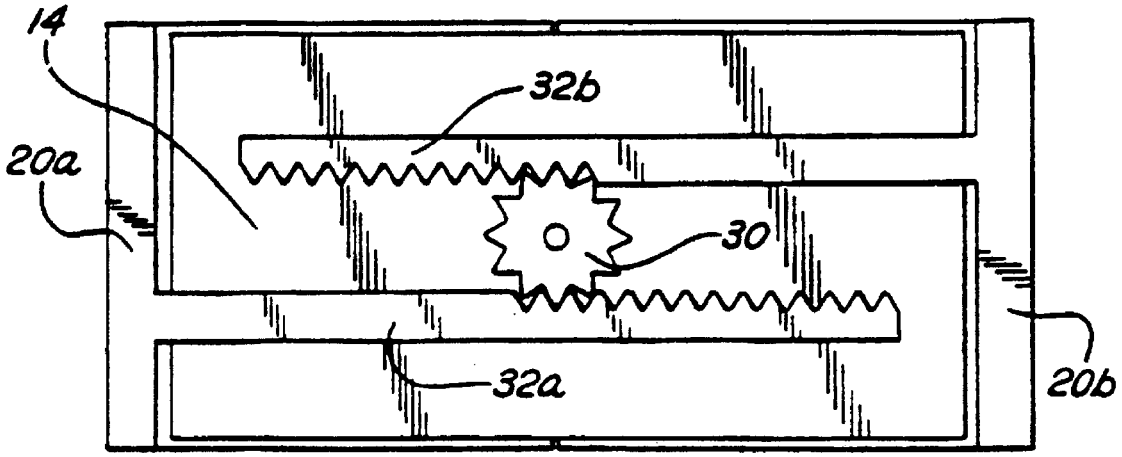
FIG. 3 is an elevational view of an alternative embodiment of the present invention with parts broken away showing the internal operations of a spur gear mechanism for moving the doors.

In an alternative embodiment shown in FIG. 3, a spur gear 30 cooperates with a first rack 32a and a second rack 32b to simultaneously move the first door 20a and the second door 20b between the extended position and the retracted position. Each of the first rack 32a and the second rack 32b have a serrated portion [34a and 34b respectively] which cooperates with the spur gear 30 which cause the spur gear 30 to rotate in response to longitudinal movement of the first rack 32a and the second rack 32b longitudinally along the spur gear 30. The spur gear 30 is rotatably mounted to the back of the mirror 14. As the first door 20a and the second door 20b are moved between the retracted position and the extended position, the first rack 32a and the second rack 32b travel along the spur gear 30 to simultaneously move the first door 20a and the second door 20b in opposed relation to selectively cover and uncover the mirror 14.

In an alternative embodiment (not shown), it is possible to have doors 20a and 20b move to a retracted position uncovering mirror 14 without being substantially located within the shell 12, but rather, overlaying the visor 10.

While the preferred embodiment and alternative embodiments of the invention have been described in detail, those familiar with the art to which this invention relates will recognize various alternative designs and embodiments for practicing the invention as defined by the following claims.

What is claimed is:

1. An arrangement for selectively covering and uncovering a mirror disposed within a hollow vehicle visor, the vehicle visor defining therein a channel and an opening exposing the mirror, the arrangement comprising:

a pair of doors selectably and linearly movable within the channel between an extended position covering the mirror and a retracted position uncovering the mirror.

said pair of doors including a first door and a second door, each of said pair of doors having an upper edge and a lower edge and each of said pair of doors having a proximate end closest to that of the other of said pair of doors and a distal end farthest from that of the other of said pair of doors;

conversion means concealably disposed behind the mirror for converting a motion of either one of said pair of doors in one direction to a simultaneous motion of the other one of said pair of doors in the opposite direction.

said conversion means including rotatable transfer means rotatably disposed behind the mirror for transferring reversed linear motion from either of said pair of doors to the other of said pair of doors, said rotatable transfer means including a first lever having a first end and a second end and being pivotally and centrally mounted on the visor behind the mirror;

first linear transfer means connected to said first door and cooperatively engaged with said rotatable transfer means for applying a torque thereto when said first door is linearly moved within the channel.

said first linear transfer means including a second lever having a first end and a second end, the first end of said second lever being pivotally connected to the first end of said first lever, the second end of said second lever being pivotally connected to the distal end of said first door near the upper edge thereof; and second linear transfer means connected to said second door and cooperatively engaged with said rotatable transfer means for applying a torque thereto when said second door is linearly moved within the channel, said second linear transfer means including a third lever having a first and a second end, the first end of said third lever being pivotally connected to the second end of said first lever, the second end of said third lever being pivotally connected to the distal end of said second door near the lower edge thereof, each of aid first, second and third levers being angularly disposed with respect to the lever to which it is pivotally connected when said pair of doors are in their extended position and said levers being substantially linearly disposed when said pair of doors are in their retracted position, said first and second linear transfer means being in diametrically opposed engagement with said rotatable transfer means so that a linear motion of one of said pair of doors in one direction causes a rotation of said rotatable transfer means and, consequently, a linear motion of the other of said pair of doors in the opposite direction, said rotatable transfer means and said first and second linear transfer means being disposed behind the mirrors and said pair of doors and being thereby concealed from view.

2. The arrangement of claim 1, further comprising grip means located on one of said pair of doors for gripping said one of said pair of doors enabling movement thereof between aid extended position and said retracted position.

3. The arrangement of claim 2 wherein said grip means includes a handle located on at least one of said pair of doors to facilitate movement thereof along said channel.

4. The arrangement of claim 1, further comprising initiating means cooperative with one of said pair of doors and remotely located therefrom, for initiating movement of said pair of doors between said extended position and said retracted position.

*5. An arrangement for selectively covering and uncovering a mirror disposed within a hollow vehicle visor, the vehicle visor defining therein a channel and an opening exposing the mirror, the arrangement comprising:*

*a pair of doors selectably and linearly movable within the channel between an extended position covering the mirror and a retracted position uncovering the mirror,*

*said pair of doors including a first door and a second door, each of said pair of doors having a front side and a back side and each of said pair of doors having a proximate end closest to that of the other of said pair of doors and a distal end farthest from that of the other of said pair of doors; and*

*conversion means concealably disposed along said channel behind said pair of doors for converting a motion of either one of said pair of doors in one direction to a simultaneous motion of the other one of said pair of doors in the opposite direction,*

*said conversion means including rotatable transfer means rotatably disposed adjacent the mirror for transferring reversed linear motion from either of said pair of doors to the other of said pair of doors,*

*said rotatable transfer means including a first portion being pivotally and concealably mounted with respect to the mirror when the mirror is exposed;*

*first linear transfer means connected to said first door and cooperatively engaged with said rotatable transfer means for applying a torque thereto when said first door is linearly moved within the channel,*

*said first linear transfer means including a second portion extending sufficiently from the back side of said first door to be drivably connected to one side of said first portion, said second portion being connected to said back side of said first door; and*

*second linear transfer means connected to said second door and cooperatively engaged with said rotatable transfer means for applying a torque thereto when said second door is linearly moved within the channel,*

*said second linear transfer means including a third portion extending sufficiently from the back side of said second door to be drivably connected to the other side of said first portion, said third portion being connected to said back side of said second door,*

*said second and third portions respectively of said first and second linear transfer means being in diametrically opposed engagement with said rotatable transfer means so that a linear motion of one of said pair of doors in one direction causes a rotation of said rotatable transfer means and, consequently, a linear motion of the other of said pair of doors in the opposite direction, said rotatable transfer means and said first and second linear transfer means being disposed sufficiently remote from the mirror and the channel to be concealed from view when selectively covering and uncovering the mirror.*

*6. The arrangement of claim 5 wherein said first portion is a spur gear portion and said second portion and said third portion are serrated rack portions.*

*7. The arrangement of claim 5 wherein at least one of said second and third portions is integral with its respective first and second door.*

*8. An arrangement for selectively covering and uncovering a mirror disposed within a hollow vehicle visor shell, the vehicle visor shell defining a channel and an opening exposing the mirror, the arrangement comprising:*

*a pair of doors selectably and linearly movable within the channel between an extended position covering the mirror and a retracted position uncovering the mirror,*

*said pair of doors including a first door and a second door, each of said pair of doors having an upper edge and a lower edge and each of said pair of doors having a proximate end closest to that of the other of said pair of doors and a distal end farthest from that of the other of said pair of doors and forming a back side of the door; and*

*conversion means concealably disposed along said channel behind said doors and within said vehicle visor shell for converting a motion of either one of said pair of doors in one direction to a simultaneous motion of the other one of said pair of doors in the opposite direction,*

*said conversion means including rotatable transfer means rotatably disposed adjacent the mirror for transferring reversed linear motion from either of said pair of doors to the other of said pair of doors,*

*said rotatable transfer means including a spur gear portion being pivotally and concealably mounted with respect to the mirror when the mirror is exposed;*

*first linear transfer means connected to said first door and cooperatively engaged with said rotatable transfer means for applying a torque thereto when said first door is linearly moved within the channel,*

*said first linear transfer means including a first rack portion extending sufficiently from said back side of said first door to be drivably connected to one side of said spur gear portion, said first rack portion being concealably connected to said back side of said first door; and*

*second linear transfer means connected to said second door and cooperatively engaged with said rotatable transfer means for applying a torque thereto when said second door is linearly moved within the channel,*

*said second linear transfer means including a second rack portion extending sufficiently from said backside of said second door to be drivably connected to the other side of said spur gear portion, said second rack portion being concealably connected to said back side of said second door,*

*said first and second rack portions respectively of said first and second linear transfer means being in diametrically opposed engagement with said spur gear portion of said rotatable transfer means so that a linear motion of one of said pair of doors in one direction causes a rotation of said spur gear portion and, consequently, a linear motion of the other of said pair of doors in the opposite direction, said rotatable transfer means and said first and second linear transfer means being disposed sufficiently remote from the mirror and said channel to be concealed from view when selectively covering and uncovering the mirror.*

*9. A visor mirror assembly for a vehicle comprising:*

*a hollow shell having a mirror supported by a housing within the shell;*

*said housing having a channel adjacent the mirror;*

*a pair of sliding opposed doors slidably mounted to said housing for movement in said channel toward one another between a closed position for covering said mirror and away from one another toward an open position exposing said mirror for use; and*

*means extending in concealably spaced relationship along said channel of said housing for intercoupling said doors such that movement of one door synchronously moves the remaining door in an opposite direction and through the same distance.*

*10. The visor mirror assembly of claim 9 wherein the means extending in concealably spaced relationship along said channel includes a spur gear portion and a rack portion.*

* * * * *

UNITED STATES PATENT AND TRADEMARK OFFICE

CERTIFICATE OF CORRECTION

PATENT NO. : Re. 35,622

DATED : October 7, 1997

INVENTOR(S) : DOUGLAS J. WILSON

It is certified that error appears in the above-identified patent and that said Letters Patent is hereby corrected as shown below:

Column 5, Line 23, delete "aid" and insert --said--.

Column 5, Line 43, delete "aid" and insert --said--.

Signed and Sealed this

Eleventh Day of August 1998

Bruce Lehman

*Attest:*

BRUCE LEHMAN

*Attesting Officer*

*Commissioner of Patents and Trademarks*